United States Patent
Ravipalli et al.

(10) Patent No.: US 12,481,345 B2
(45) Date of Patent: Nov. 25, 2025

(54) TECHNIQUES FOR POWER MANAGEMENT IN COMPUTE CIRCUITS

(71) Applicant: Intel Corporation, Santa Clara, CA (US)

(72) Inventors: Sreedhar Ravipalli, Cupertino, CA (US); Mahesh Kumashikar, Bangalore (IN); Md Altaf Hossain, Portland, OR (US); Ankireddy Nalamalpu, Portland, OR (US)

(73) Assignee: Altera Corporation, San Jose, CA (US)

( * ) Notice: Subject to any disclaimer, the term of this patent is extended or adjusted under 35 U.S.C. 154(b) by 639 days.

(21) Appl. No.: 17/849,625

(22) Filed: Jun. 25, 2022

(65) Prior Publication Data

US 2022/0334630 A1 Oct. 20, 2022

(51) Int. Cl.
*G06F 1/32* (2019.01)
*G06F 1/3206* (2019.01)
*G06F 1/324* (2019.01)

(52) U.S. Cl.
CPC ............ *G06F 1/324* (2013.01); *G06F 1/3206* (2013.01)

(58) Field of Classification Search
CPC ................................ G06F 1/324; G06F 1/3206
See application file for complete search history.

(56) References Cited

U.S. PATENT DOCUMENTS

| 6,546,496 B1 * | 4/2003 | Wang ................... G06F 1/3237 713/322 |
| 7,730,340 B2 | 6/2010 | Hu et al. |
| 2010/0218028 A1 * | 8/2010 | Yu ........................ H04L 12/10 713/340 |
| 2013/0198538 A1 * | 8/2013 | Diab ................... G06F 1/3278 713/310 |
| 2019/0095564 A1 | 3/2019 | Atsatt |

* cited by examiner

*Primary Examiner* — Stefan Stoynov
(74) *Attorney, Agent, or Firm* — InventIQ Legal LLP; Steven J. Cahill (57) ABSTRACT

A circuit system includes an accelerator circuit and a compute circuit. The accelerator circuit generates a request in response to receiving packets of data. The accelerator circuit generates an indication of a low power state based on a reduced number of the packets of data being received. The compute circuit performs a processing operation for the accelerator circuit using the packets of data in response to receiving the request. The compute circuit comprises a power management circuit that decreases a supply voltage in the compute circuit and decreases a frequency of a clock signal in the compute circuit in response to the indication of the low power state from the accelerator circuit.

20 Claims, 4 Drawing Sheets

TECHNIQUES FOR POWER MANAGEMENT IN COMPUTE CIRCUITS

FIELD OF THE DISCLOSURE

The present disclosure relates to electronic circuits, and more particularly, to techniques for power management in compute circuits.

BACKGROUND

Configurable logic integrated circuits can be configured by users to implement desired custom logic functions. In a typical scenario, a logic designer uses computer-aided design tools to design a custom logic circuit. When the design process is complete, the computer-aided design tools generate configuration data. The configuration data is then loaded into configuration memory elements that configure configurable logic circuits in the integrated circuit to perform the functions of the custom logic circuit. Configurable logic integrated circuits can be used for co-processing in big-data or fast-data applications. For example, configurable logic integrated circuits may be used in application acceleration tasks in a datacenter and may be reprogrammed during datacenter operation to perform different tasks.

DETAILED DESCRIPTION

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This disclosure discusses circuit systems that can be implemented in integrated circuit devices, including configurable (programmable) logic devices such as field programmable gate arrays (FPGAs). As discussed herein, an integrated circuit (IC) may include hard logic and/or soft logic. As used herein, "hard logic" generally refers to circuits in an integrated circuit device that are not programmable by an end user. The circuits in an integrated circuit device (e.g., in a configurable IC) that are programmable by the end user are referred to as "soft logic."

A server computer in a datacenter can include one or more host processors and one or more coprocessors that function as acceleration devices. The host processor may be tasked to perform a pool of jobs/tasks. In order to improve the speed at which these tasks are performed, one or more of the coprocessor integrated circuit (IC) dies can be used to perform a subset of the pool of tasks. The host processor can send acceleration requests to one of the coprocessor IC dies. The coprocessor IC die functions as an accelerator circuit.

Hardware acceleration devices may be used for co-processing in big-data, fast-data, or high performance compute (HPC) applications in one or more server computers in a datacenter. By offloading acceleration functions (e.g., computationally intensive tasks) from a host processor to one or more coprocessors that function as acceleration devices, the host processor is freed up to perform other critical processing tasks. The use of hardware accelerators can therefore help deliver improved speed, latency, power efficiency, and flexibility for acceleration functions, such as cryptography, end-to-end cloud computing, networking, storage, artificial intelligence, autonomous driving, virtual reality, augmented reality, gaming, and other data-centric applications. An acceleration device may be a programmable logic integrated circuit (IC), such as a field programmable gate array (FPGA) that contains soft logic circuitry programmed to perform acceleration functions for a host processor, an application specific IC (ASIC) that contains hard logic circuitry designed to perform acceleration functions for a host processor, or an IC that combines soft and hard logic circuitry.

Accelerator devices may be used in server computers to perform networking functions for packets of data that are transmitted to the server computers through one or more networks. The accelerator devices can use compute processing devices to set up routing for new packets of data that are transmitted to the server computers through a network. The accelerator devices send interrupts to the compute processing devices to start the routing set up operations. The compute processing devices typically operate at a fixed clock frequency regardless of the number of interrupts received from the accelerator devices. As a result, the compute processing devices generate unnecessary power consumption when the compute processing devices are not performing processing functions.

According to some examples disclosed herein, an infrastructure processing system (IPS) includes a host processor, an accelerator circuit that accelerates functions for the host processor, and a compute circuit that performs computations for the accelerator circuit. The accelerator circuit provides an indication of a power state to the compute circuit. The accelerator circuit may, for example, include a power management interface circuit that transmits an indication of a low power state to the compute circuit when the accelerator circuit has no pending requests. The compute circuit can interpret the indication of the low power state as a request to operate at a lower clock frequency and/or at a lower supply voltage. In response to receiving the indication of the low power state, a power management circuit in the compute circuit automatically switches to the low power state by decreasing the clock frequency and/or the supply voltage used by the compute circuit, for example, using dynamically voltage and frequency scaling (DVFS) power management techniques. As a result, the compute circuit consumes less power in the low power state, while the compute circuit is not being used to perform computations for the accelerator circuit.

Dynamic Voltage and Frequency Scaling (DVFS) is a technique that is typically used to provide power optimization in a processor circuit during run-time. DVFS may be performed in hardware, in an operating system (OS), or in a user-level application. A hardware-level DVFS monitors processor load and scales the supply voltage in response to the indication of the power state received from the accelerator circuit. An OS-level DVFS uses heuristic scheduling based on a fixed time interval or scheduled tasks to perform DVFS in response to the power state indication. User-level DVFS enables a user application to profile processor utilization during execution and scale the supply voltage or clock frequency up or down in response to the power state indication. Typically, a just-in-time (JIT) compiler is used to recompile the user application so that it can perform DVFS.

When the accelerator circuit needs the compute circuit to perform more processing functions, the power management interface circuit in the accelerator circuit transmits an indication of a high power state to the compute circuit. In response to receiving the indication of the high power state, the power management circuit in the compute circuit automatically switches to the high power state by increasing the clock frequency and/or the supply voltage, for example, using DVFS power management techniques. In the high power state, the compute circuit is able to perform the processing functions for the accelerator circuit more quickly. As a more specific example, the accelerator circuit can transmit a request to the compute circuit to gradually increase the clock frequency and/or the supply voltage based on one or more thresholds (or watermarks). As another example, the accelerator circuit can transmit a request to the compute circuit to increase the clock frequency in a single step and/or to increase the supply voltage in a single step. These techniques lower the power consumption and the cost of operation for the IPS.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices. The term "circuit" may mean one or more passive and/or active electrical components that are arranged to cooperate with one another to provide a desired function.

Figure 1:
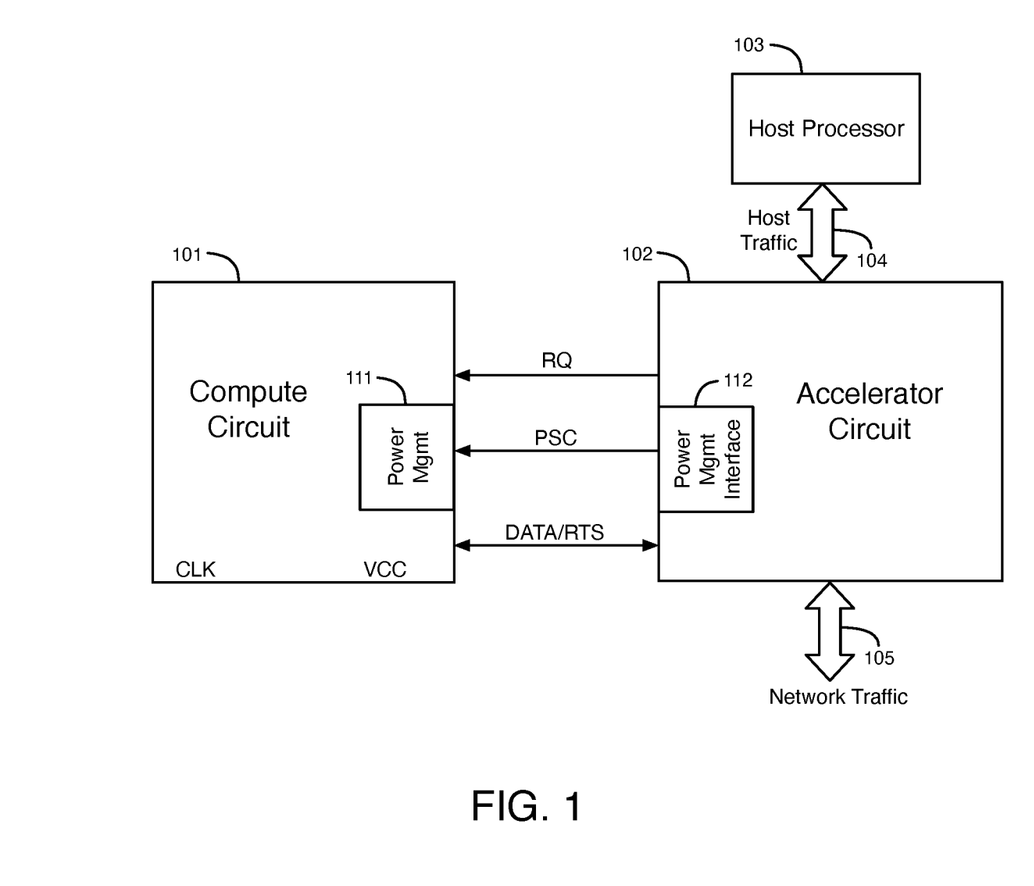
FIG. 1 illustrates an example of an infrastructure processing system (IPS) that includes a host processor, an accelerator circuit that accelerates functions for the host processor, and a compute circuit that performs processing operations for the accelerator circuit.

FIG. 1 is a diagram that illustrates an example of an infrastructure processing system (IPS) that includes a host processor 103, an accelerator circuit 102 that accelerates functions for the host processor, and a compute circuit 101 that performs processing operations for the accelerator circuit 102. The compute circuit 101 may be, for example, a processor integrated circuit (IC), such as a microprocessor IC or a central processing unit (CPU). The acceleration circuit 102 may be, for example, a programmable logic integrated circuit (IC), such as a field programmable gate array (FPGA) that contains soft logic circuitry programmed to perform acceleration functions, an application specific IC (ASIC) that contains hard logic circuitry designed to perform acceleration functions, or an IC that combines soft and hard logic circuitry. The host processor 103 may, for example, contain one or more processing cores that are located in one or more processing integrated circuits (ICs).

According to other examples, the compute circuit 101 and the accelerator circuit 102 may be in the same integrated circuit (IC) die. In these examples, a single integrated circuit (IC) die contains circuitry that performs the function disclosed herein for the compute circuit 101 and circuitry that performs the functions disclosed herein for the accelerator circuit 102. The circuitry that performs the functions of the accelerator circuit 102 and the circuitry that performs the functions of the compute circuit 101 may be hard logic, soft logic, or any combination thereof. An IC die that contains compute circuit 101 and accelerator circuit 102 can be a programmable logic IC, a processor IC, or a hybrid IC that contains hard and soft logic circuitry.

In the example of FIG. 1, network traffic that includes packets of data are transmitted through a communications network 105 to the accelerator circuit 102. Accelerator circuit 102 performs networking functions for the packets of data received through communications network 105 to generate processed packets of data. The accelerator circuit 102 can, for example, perform networking functions that are defined according to one or more of the layers of the Open Systems Interconnection (OSI) model. The compute circuit 101 performs processing operations, such as computations, for the accelerator circuit 102. The compute circuit 101 can, for example, set up routing tables for new connections for routing the new packets of data within the IPS that are transmitted to accelerator circuit 102 through network 105. The accelerator circuit 102 provides DATA signals indicating the new packets of data to the compute circuit 101. The compute circuit 101 provides signals RTS indicating the routing tables back to the accelerator circuit 102. Accelerator circuit 102 transmits the processed packets of data to the host processor 103 through a link 104.

The accelerator circuit 102 can transmit a request in one or more signals RQ to compute circuit 101. The RQ, DATA, and RTS signals can be transmitted over a Peripheral Component Interconnect Express (PCIe) bus or any other type of die-to-die connections. Accelerator circuit 102 controls the processing functions (e.g., computations) that the compute circuit 101 performs on each new packet of data using the request indicated by signals RQ. The accelerator circuit 102 includes a power management interface circuit 112 that transmits one or more power state control signals PSC to a power management circuit 111 in the compute circuit 101 through a single control line or multiple control lines (e.g., a bus of signals). The power state control signals PSC are indicative of a power state. Accelerator circuit 102 controls the power state of the compute circuit 101 using the power state control signals PSC. The power management circuit 111 controls dynamic voltage and frequency scaling (DVFS) in the compute circuit 101 in response to the power state control signals PSC, as described in further detail below with respect to FIG. 3.

Figure 2:
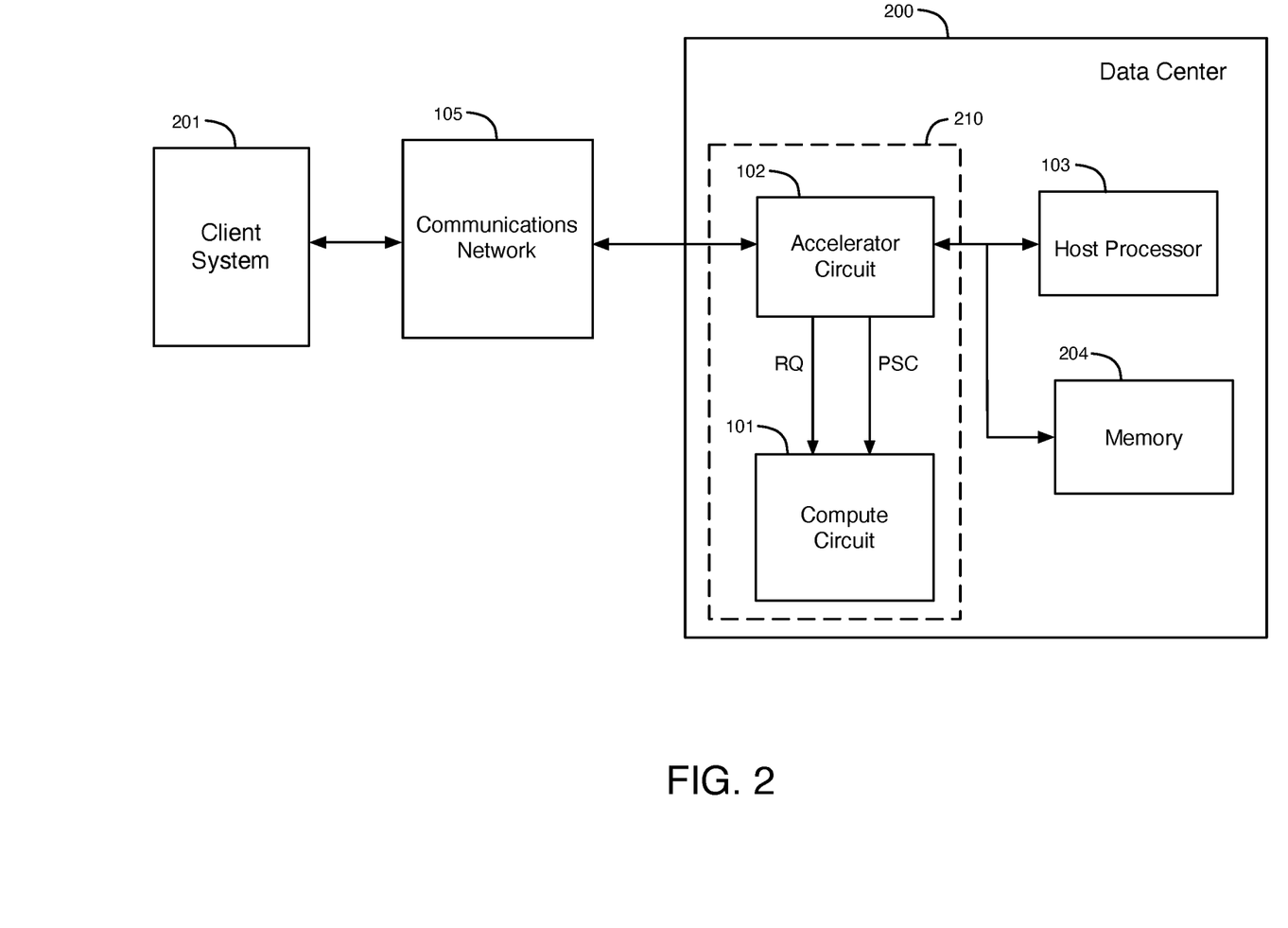
FIG. 2 illustrates an example of a datacenter that includes the infrastructure processing system (IPS) of FIG. 1.

FIG. 2 is a diagram that illustrates an example of a datacenter 200 that includes the infrastructure processing system (IPS) of FIG. 1. In the example of FIG. 2, the datacenter 200 includes the compute circuit 101, the accelerator circuit 102, and the host processor 103 shown in FIG. 1. In the example of FIG. 2, the accelerator circuit 102 and the compute circuit 101 are in a circuit system 210. Circuit system 210 may be, for example, a single integrated circuit die, a multi-chip integrated circuit package housing IC dies 101-102, or a circuit board coupled to IC dies 101-102.

The datacenter 200 also includes one or more memory storage devices 204. The components shown in datacenter 200 can be in one or more server computers. FIG. 2 also shows a client system 201 and the communications network 105. The client system 201 transmits packets of data to the accelerator circuit 102 through the communications network 105. The accelerator circuit 102 and the compute circuit 101 process the packets of data as disclosed herein to generate processed packets of data. The processed packets of data are transmitted to host processor 103 and/or to memory 204. Host processor 103 can also generate packets of data that are transmitted to accelerator circuit 102. Accelerator circuit 102 can perform networking functions on the packets of data to generate processed packets of data that are transmitted to the client system 201 through communications network 105.

Figure 3:
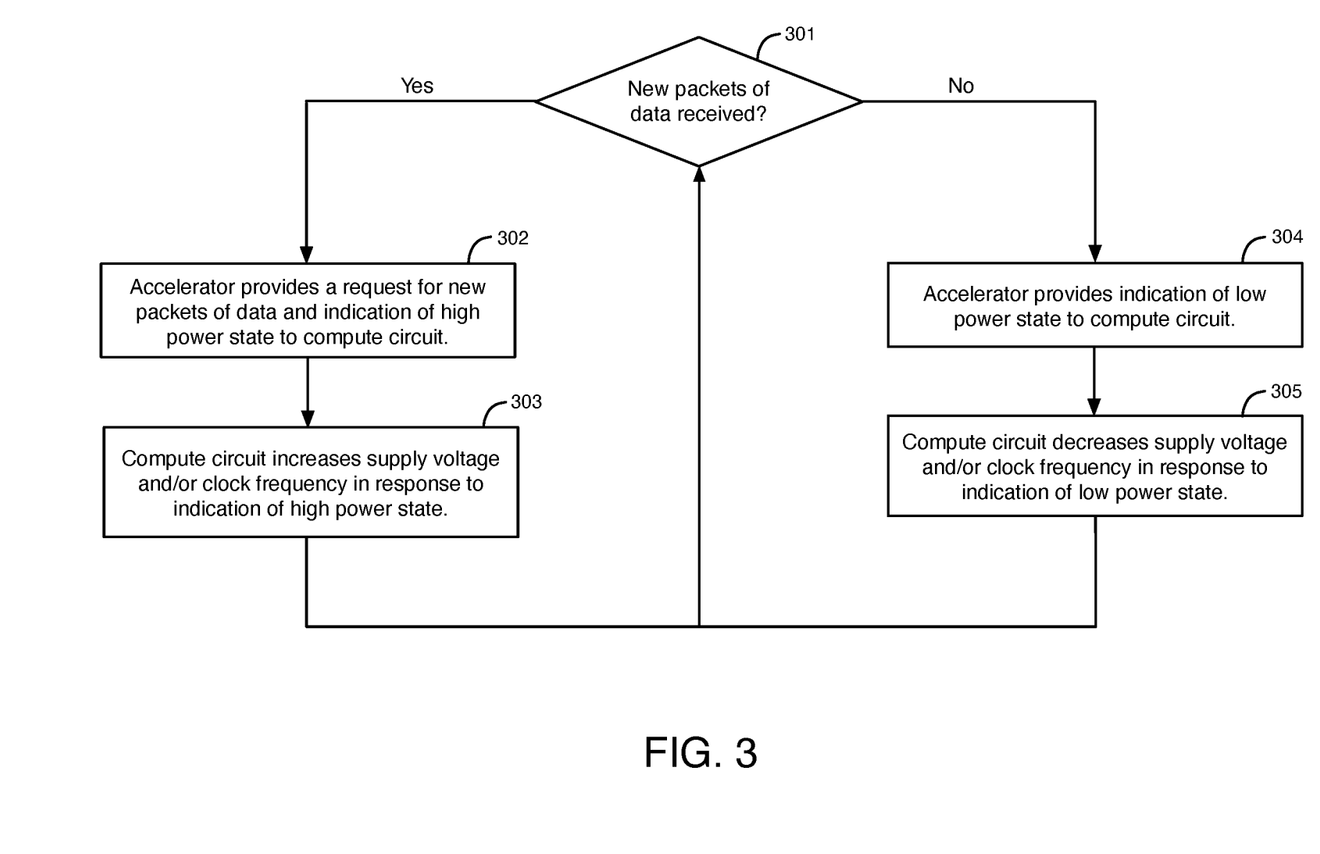
FIG. 3 is a flow chart that illustrates examples of operations that may be performed to change power states in the compute circuit of FIG. 1 using the accelerator circuit of FIG. 1.

FIG. 3 is a flow chart that illustrates examples of operations that can be performed to change power states in the compute circuit 101 using the accelerator circuit 102. In decision operation 301, the accelerator circuit 102 determines if new packets of data have been received in network traffic (e.g., through communications network 105). If new packets of data have been received at the accelerator circuit 102, then in operation 302, the accelerator circuit 102 generates a request and provides the request in signals RQ to the compute circuit 101 to indicate that the compute circuit 101 needs to perform processing functions for one or more of the new packets of data. The accelerator circuit 102 also provides the one or more packets of data to the compute circuit 101 in signals DATA so that the compute circuit 101 can perform the processing functions.

Also, in operation 302, the power management interface circuit 112 in accelerator circuit 102 provides an indication of a high power state in power control signals PSC to the compute circuit 101. In operation 303, the power management circuit 111 in the compute circuit 101 increases a supply voltage (VCC) in the compute circuit 101 and/or increases a frequency of a clock signal (CLK) in the compute circuit 101 in response to the indication of the high power state in signals PSC using dynamic voltage and frequency scaling (DVFS) techniques. The compute circuit 101 then performs the processing functions in response to the request at the increased supply voltage and/or at the increased clock signal frequency. For example, the compute circuit 101 can set up routing tables for new connections for routing the new packets of data in the circuit system that are received from the accelerator circuit 102 in the data signals DATA at the increased supply voltage and/or at the increased clock signal frequency. The compute circuit 101 can then transmit the routing tables to the accelerator circuit 102 in signals RTS.

If no new packets of data have been received at the accelerator circuit 102 within a predefined time period at operation 301, then in operation 304, the power management interface circuit 112 in accelerator circuit 102 provides an indication of a low power state in power control signals PSC to the compute circuit 101. Also, the accelerator circuit 102 refrains from generating any additional requests in signals RQ in response to no new packets of data being received in operation 301. In operation 305, the power management circuit 111 in the compute circuit 101 decreases the supply voltage (VCC) in the compute circuit 101 and/or decreases the frequency of the clock signal (CLK) in the compute circuit 101 in response to the indication of the low power state in signals PSC using dynamic voltage and frequency scaling (DVFS) techniques. The compute circuit 101 can, for example, decrease each of the supply voltage and/or the clock signal frequency in a single step. The compute circuit 101 can then perform additional operations using the decreased supply voltage and/or the decreased clock signal frequency.

Alternatively, in operation 304, the accelerator circuit 102 can transmit indications of multiple low power states in signals PSC to the compute circuit 101 at different times. The accelerator circuit 102 can, for example, store the incoming packets of data in a queue (e.g., in a first-in-first-out buffer) in accelerator circuit 102. The accelerator circuit 102 can generate the indications of multiple low power states based on the number of the packets of data stored in the queue decreasing below one or more thresholds (or watermarks). As a more specific example, if the packets of data stored in the queue decrease below a first threshold, then accelerator circuit 102 generates an indication of a first low power state in signals PSC. If the packets of data stored in the queue decrease below a second threshold that is less than the first threshold, then accelerator circuit 102 generates an indication of a second low power state, that is lower than the first low power state, in signals PSC. These thresholds can be configurable and can be determined by a user.

In operation 305, the compute circuit 101 can gradually (or in multiple steps) decrease the clock signal frequency (CLK) and/or the supply voltage (VCC) in response to the indications of the multiple low power states received in signals PSC. For example, the power management circuit 111 can decrease the supply voltage from a first voltage to a second voltage and decrease the frequency of the clock signal from a first clock frequency to a second clock frequency in response to the indication of the first low power state. The power management circuit 111 can decrease the supply voltage from the second voltage to a third voltage and decrease the frequency of the clock signal from the second clock frequency to a third clock frequency in response to the indication of the second low power state. According to additional examples, the compute circuit 101 can support 3, 4, 5, 6, or more power states that are controlled by the accelerator circuit 102 using the power state control signals PSC.

Figure 4:
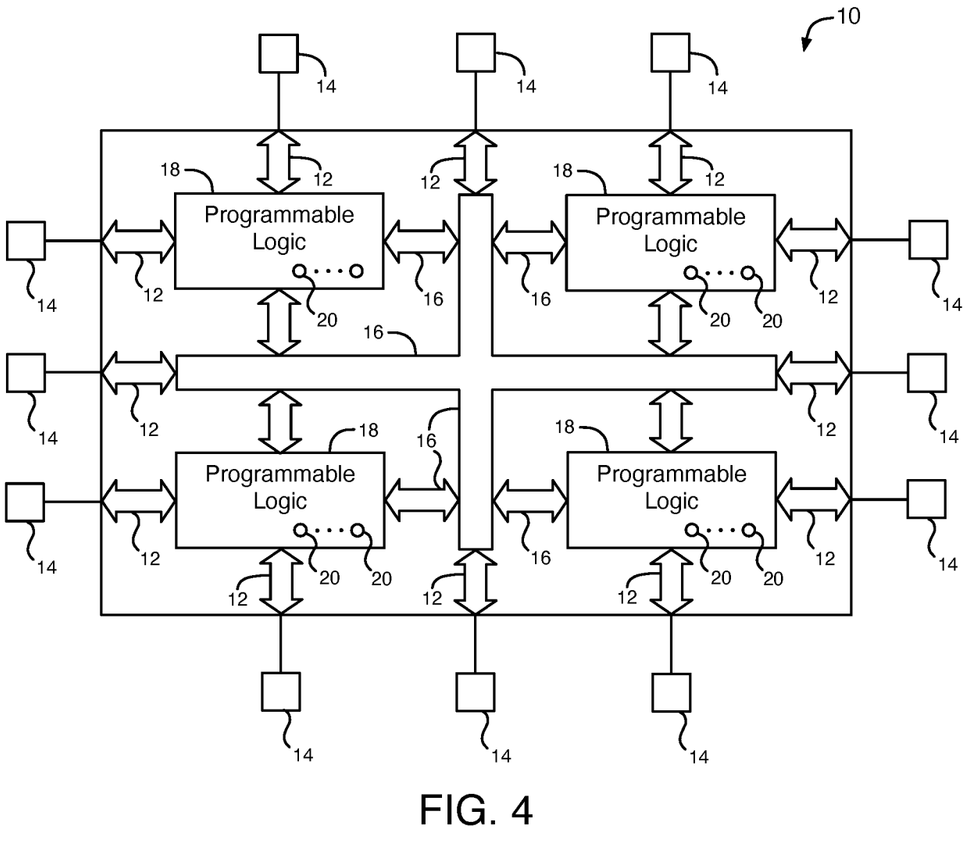
FIG. 4 is a diagram of an illustrative programmable (i.e., configurable) logic integrated circuit (IC) that may be programmed according to a user design.

FIG. 4 is a diagram of an illustrative programmable (i.e., configurable) logic integrated circuit (IC) 10 that may be programmed according to a user design. As shown in FIG. 4, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. Programmable logic circuitry 18 may be configured to perform custom logic functions.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in programmable logic circuitry 18. Typically, the memory element output signals are used to control the gates of field-effect transistors. In the context of programmable integrated circuits, the memory elements 20 store configuration data and are sometimes referred to as configuration random-access memory (CRAM) cells. The configuration data programs the programmable logic 18 to perform the custom logic functions according to the user design.

In general, software and data for performing any of the functions disclosed herein may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now described. Example 1 is a circuit system comprising: an accelerator circuit that generates a request in response to receiving packets of data, wherein the accelerator circuit generates an indication of a first low power state based on receiving a reduced number of the packets of data; and a compute circuit that performs a processing operation for the accelerator circuit using the packets of data in response to receiving the request, wherein the compute circuit comprises a power management circuit that decreases a supply voltage in the compute circuit and decreases a frequency of a clock signal in the compute circuit in response to the indication of the first low power state from the accelerator circuit.

In Example 2, the circuit system of Example 1 further comprises: a host processor, wherein the accelerator circuit accelerates networking functions for the host processor by processing the packets of data received through a network to generate processed packets of data and to provide the processed packets of data to the host processor.

In Example 3, the circuit system of any one of Examples 1-2 can optionally include, wherein the compute circuit sets up routing tables for new connections for routing the packets of data in the circuit system in response to receiving the request.

In Example 4, the circuit system of any one of Examples 1-3 can optionally include, wherein the accelerator circuit generates the indication of the first low power state based on a number of the packets of data stored in a queue being less than a first threshold, and wherein the accelerator circuit generates an indication of a second low power state based on the number of the packets of data stored in the queue being less than a second threshold.

In Example 5, the circuit system of Example 4 can optionally include, wherein the power management circuit decreases the supply voltage from a first voltage to a second voltage and decreases the frequency of the clock signal from a first clock frequency to a second clock frequency in response to the indication of the first low power state, and wherein the power management circuit decreases the supply voltage from the second voltage to a third voltage and decreases the frequency of the clock signal from the second clock frequency to a third clock frequency in response to the indication of the second low power state.

In Example 6, the circuit system of any one of Examples 1-5 can optionally include, wherein the accelerator circuit generates an indication of a high power state based on an increased number of the packets of data being received, and wherein the power management circuit increases the supply voltage and increases the frequency of the clock signal in response to the indication of the high power state.

In Example 7, the circuit system of any one of Examples 1-6 can optionally include, wherein the accelerator circuit is a programmable logic integrated circuit, and wherein the compute circuit is a processor integrated circuit.

In Example 8, the circuit system of any one of Examples 1-7 can optionally include, wherein the accelerator circuit and the compute circuit are in a single integrated circuit die.

Example 9 is a method for reducing power consumption in a compute circuit in a circuit system, the method comprising: generating a request in response to receiving packets of data from a network using an accelerator circuit in the circuit system; performing a processing operation with the compute circuit using the packets of data for the accelerator circuit in response to receiving the request; generating an indication of a first low power state using the accelerator circuit in response to receiving less of the packets of data; decreasing a supply voltage in the compute circuit in response to the indication of the first low power state from the accelerator circuit; and decreasing a frequency of a clock signal in the compute circuit in response to the indication of the first low power state from the accelerator circuit.

In Example 10, the method of Example 9 further comprises: performing networking functions for the packets of data received from the network to generate processed packets of data, wherein performing the processing operation using the packets of data with the compute circuit comprises: setting up routing tables for new connections for routing the packets of data in the circuit system that are received at the accelerator circuit.

In Example 11, the method of any one of Examples 9-10 can optionally include, wherein decreasing the supply voltage and the frequency of the clock signal in the compute circuit in response to the indication of the first low power state from the accelerator circuit further comprises: adjusting the supply voltage and the frequency of the clock signal using a power management circuit in the compute circuit.

In Example 12, the method of any one of Examples 9-11 can optionally include, wherein generating the indication of the first low power state using the accelerator circuit further comprises: generating the indication of the first low power state based on a number of the packets of data stored in a queue being less than a first threshold; and generating an indication of a second low power state based on the number of the packets of data stored in the queue being less than a second threshold that is less than the first threshold.

In Example 13, the method of Example 12 can optionally include, wherein decreasing the supply voltage and the frequency of the clock signal in the compute circuit in response to the indication of the first low power state from the accelerator circuit further comprises: decreasing the supply voltage from a first voltage to a second voltage and decreasing the frequency of the clock signal from a first clock frequency to a second clock frequency in response to the indication of the first low power state; and decreasing the supply voltage from the second voltage to a third voltage and decreasing the frequency of the clock signal from the second clock frequency to a third clock frequency in response to the indication of the second low power state.

In Example 14, the method of any one of Examples 9-13 further comprises: generating an indication of a high power state using the accelerator circuit based on an increased number of the packets of data being received; increasing the supply voltage in the compute circuit in response to the indication of the high power state from the accelerator circuit; and increasing the frequency of the clock signal in the compute circuit in response to the indication of the high power state from the accelerator circuit.

In Example 15, the method of Example 10 further comprises: transmitting the processed packets of data from the accelerator circuit to the compute circuit; and transmitting the routing tables for the new connections from the compute circuit to the accelerator circuit.

Example 16 is a circuit system comprising: a host processor circuit; an accelerator circuit configurable to accelerate networking functions for the host processor circuit by processing packets of data received through a network, wherein the accelerator circuit is configurable to generate a request in response to receiving at least one of the packets of data, and wherein the accelerator circuit is configurable to generate an indication of a first low power state in response to receiving less of the packets of data; and a compute circuit that performs computations for the packets of data that are received from the accelerator circuit in response to receiving the request, wherein the compute circuit decreases a supply voltage or a frequency of a clock signal in response to the indication of the first low power state to reduce power consumption in the compute circuit.

In Example 17, the circuit system of Example 16 can optionally include, wherein the accelerator circuit is configurable to generate the indication of the first low power state based on a number of the packets of data stored in a queue being less than a first threshold, and wherein the accelerator circuit is configurable to generate an indication of a second low power state based on the number of the packets of data stored in the queue being less than a second threshold that is less than the first threshold.

In Example 18, the circuit system of Example 17 can optionally include, wherein the compute circuit comprises a power management circuit that decreases the supply voltage from a first voltage to a second voltage and decreases the frequency of the clock signal from a first clock frequency to a second clock frequency in response to the indication of the first low power state, and wherein the power management circuit decreases the supply voltage from the second voltage to a third voltage and decreases the frequency of the clock signal from the second clock frequency to a third clock frequency in response to the indication of the second low power state.

In Example 19, the circuit system of any one of Examples 16-18 can optionally include, wherein the accelerator circuit generates an indication of a high power state based on more of the packets of data being received, and wherein the compute circuit increases the supply voltage and increases the frequency of the clock signal in response to the indication of the high power state.

In Example 20, the circuit system of any one of Examples 16-19 can optionally include, wherein the accelerator circuit is a programmable logic integrated circuit, and wherein the compute circuit sets up routing tables for new connections for routing the packets of data in the circuit system.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:

1. A circuit system comprising:
   an accelerator circuit that generates a request in response to receiving packets of data, wherein the accelerator circuit generates an indication of a first low power state based on receiving a reduced number of the packets of data; and
   a compute circuit that performs a processing operation for the accelerator circuit using the packets of data in response to receiving the request, wherein the compute circuit comprises a power management circuit that decreases a supply voltage in the compute circuit and decreases a frequency of a clock signal in the compute circuit in response to the indication of the first low power state from the accelerator circuit.

2. The circuit system of claim 1 further comprising:
   a host processor, wherein the accelerator circuit accelerates networking functions for the host processor by processing the packets of data received through a network to generate processed packets of data and to provide the processed packets of data to the host processor.

3. The circuit system of claim 1, wherein the compute circuit sets up routing tables for new connections for routing the packets of data in the circuit system in response to receiving the request.

4. The circuit system of claim 1, wherein the accelerator circuit generates the indication of the first low power state based on a number of the packets of data stored in a queue being less than a first threshold, and wherein the accelerator circuit generates an indication of a second low power state based on the number of the packets of data stored in the queue being less than a second threshold.

5. The circuit system of claim 4, wherein the power management circuit decreases the supply voltage from a first voltage to a second voltage and decreases the frequency of the clock signal from a first clock frequency to a second clock frequency in response to the indication of the first low power state, and wherein the power management circuit decreases the supply voltage from the second voltage to a third voltage and decreases the frequency of the clock signal from the second clock frequency to a third clock frequency in response to the indication of the second low power state.

6. The circuit system of claim 1, wherein the accelerator circuit generates an indication of a high power state based on an increased number of the packets of data being received, and wherein the power management circuit increases the supply voltage and increases the frequency of the clock signal in response to the indication of the high power state.

7. The circuit system of claim 1, wherein the accelerator circuit is a programmable logic integrated circuit, and wherein the compute circuit is a processor integrated circuit.

8. The circuit system of claim 1, wherein the accelerator circuit and the compute circuit are in a single integrated circuit die.

9. A method for reducing power consumption in a compute circuit in a circuit system, the method comprising:
   generating a request in response to receiving packets of data from a network using an accelerator circuit in the circuit system;
   performing a processing operation with the compute circuit using the packets of data for the accelerator circuit in response to receiving the request;
   generating an indication of a first low power state using the accelerator circuit in response to receiving less of the packets of data;
   decreasing a supply voltage in the compute circuit in response to the indication of the first low power state from the accelerator circuit; and
   decreasing a frequency of a clock signal in the compute circuit in response to the indication of the first low power state from the accelerator circuit.

10. The method of claim 9 further comprising:
    performing networking functions for the packets of data received from the network to generate processed packets of data, wherein performing the processing operation using the packets of data with the compute circuit comprises:

setting up routing tables for new connections for routing the packets of data in the circuit system that are received at the accelerator circuit.

11. The method of claim 9, wherein decreasing the supply voltage and the frequency of the clock signal in the compute circuit in response to the indication of the first low power state from the accelerator circuit further comprises:
adjusting the supply voltage and the frequency of the clock signal using a power management circuit in the compute circuit.

12. The method of claim 9, wherein generating the indication of the first low power state using the accelerator circuit further comprises:
generating the indication of the first low power state based on a number of the packets of data stored in a queue being less than a first threshold; and
generating an indication of a second low power state based on the number of the packets of data stored in the queue being less than a second threshold that is less than the first threshold.

13. The method of claim 12, wherein decreasing the supply voltage and the frequency of the clock signal in the compute circuit in response to the indication of the first low power state from the accelerator circuit further comprises:
decreasing the supply voltage from a first voltage to a second voltage and decreasing the frequency of the clock signal from a first clock frequency to a second clock frequency in response to the indication of the first low power state; and
decreasing the supply voltage from the second voltage to a third voltage and decreasing the frequency of the clock signal from the second clock frequency to a third clock frequency in response to the indication of the second low power state.

14. The method of claim 9 further comprising:
generating an indication of a high power state using the accelerator circuit based on an increased number of the packets of data being received;
increasing the supply voltage in the compute circuit in response to the indication of the high power state from the accelerator circuit; and
increasing the frequency of the clock signal in the compute circuit in response to the indication of the high power state from the accelerator circuit.

15. The method of claim 10 further comprising:
transmitting the processed packets of data from the accelerator circuit to the compute circuit; and
transmitting the routing tables for the new connections from the compute circuit to the accelerator circuit.

16. A circuit system comprising:
a host processor circuit;
an accelerator circuit configurable to accelerate networking functions for the host processor circuit by processing packets of data received through a network,
wherein the accelerator circuit is configurable to generate a request in response to receiving at least one of the packets of data, and wherein the accelerator circuit is configurable to generate an indication of a first low power state in response to receiving less of the packets of data; and
a compute circuit that performs computations for the packets of data that are received from the accelerator circuit in response to receiving the request, wherein the compute circuit decreases a supply voltage or a frequency of a clock signal in response to the indication of the first low power state to reduce power consumption in the compute circuit.

17. The circuit system of claim 16, wherein the accelerator circuit is configurable to generate the indication of the first low power state based on a number of the packets of data stored in a queue being less than a first threshold, and wherein the accelerator circuit is configurable to generate an indication of a second low power state based on the number of the packets of data stored in the queue being less than a second threshold that is less than the first threshold.

18. The circuit system of claim 17, wherein the compute circuit comprises a power management circuit that decreases the supply voltage from a first voltage to a second voltage and decreases the frequency of the clock signal from a first clock frequency to a second clock frequency in response to the indication of the first low power state, and wherein the power management circuit decreases the supply voltage from the second voltage to a third voltage and decreases the frequency of the clock signal from the second clock frequency to a third clock frequency in response to the indication of the second low power state.

19. The circuit system of claim 16, wherein the accelerator circuit generates an indication of a high power state based on more of the packets of data being received, and wherein the compute circuit increases the supply voltage and increases the frequency of the clock signal in response to the indication of the high power state.

20. The circuit system of claim 16, wherein the accelerator circuit is a programmable logic integrated circuit, and wherein the compute circuit sets up routing tables for new connections for routing the packets of data in the circuit system.

* * * * *